United States Patent [19]

Pitolaj

[11] Patent Number: 4,990,296
[45] Date of Patent: Feb. 5, 1991

[54] WELDING OF FILLED SINTERED POLYTETRAFLUOROETHYLENE

[75] Inventor: Stefan Pitolaj, Palmyra, N.Y.

[73] Assignee: Garlock Inc., Palmyra, N.Y.

[21] Appl. No.: 396,249

[22] Filed: Aug. 21, 1989

[51] Int. Cl.⁵ .............................................. B29C 65/02
[52] U.S. Cl. .................................... 264/162; 156/153; 156/158; 156/304.5; 156/304.6; 264/248; 264/348; 264/338; 264/127; 425/DIG. 55
[58] Field of Search ............... 264/162, 248, 249, 319, 264/DIG. 76, 348, 338, 331.14, 127; 156/304.51, 306.6, 153, 158; 425/DIG. 55

[56] References Cited

U.S. PATENT DOCUMENTS

| | | | |
|---|---|---|---|
| 2,833,686 | 5/1958 | Sandt | 154/139 |
| 3,207,644 | 9/1965 | Hobson et al. | 156/217 |
| 3,645,820 | 2/1972 | Clary | 156/191 |
| 3,933,565 | 1/1976 | Printz | 156/304.5 |
| 3,946,136 | 3/1976 | Fitz et al. | 156/306.6 |
| 4,073,856 | 2/1978 | Chu | 264/259 |
| 4,211,594 | 8/1980 | Freitag et al. | 156/158 |
| 4,283,448 | 8/1981 | Bowman | 428/36 |
| 4,364,884 | 12/1982 | Traut | 264/118 |
| 4,701,291 | 10/1987 | Wissman | 264/248 |
| 4,780,161 | 10/1988 | Mizuhara | 156/304.5 |

FOREIGN PATENT DOCUMENTS

| | | | |
|---|---|---|---|
| 59-194829 | 11/1984 | Japan | 264/248 |
| 861101 | 9/1981 | U.S.S.R. | 156/304.5 |

Primary Examiner—Jeffery Thurlow
Assistant Examiner—Mathieu Vargot
Attorney, Agent, or Firm—Richard W. Watson

[57] ABSTRACT

A method for welding together filled sintered polytetrafluoroethylene components. The ends of the components to be welded are carefully tapered to form reverse mated surfaces and then assembled in position to be welded. The actual welding step is carried out under heat and pressure followed by cooling under pressure. The process is particularly useful in the fabrication of very large gaskets or other very large planar objects.

16 Claims, 1 Drawing Sheet

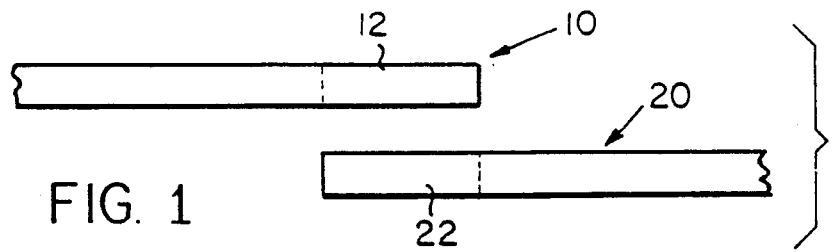
FIG. 1
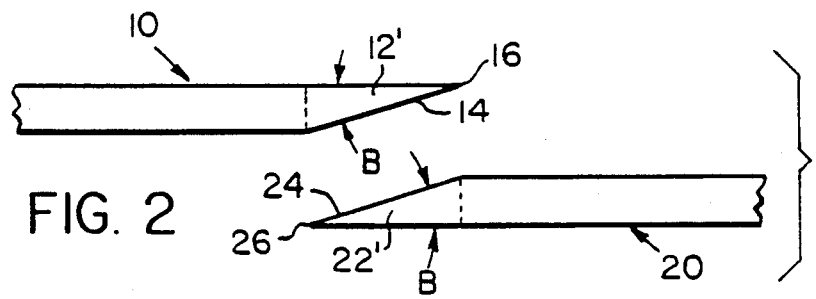
FIG. 2
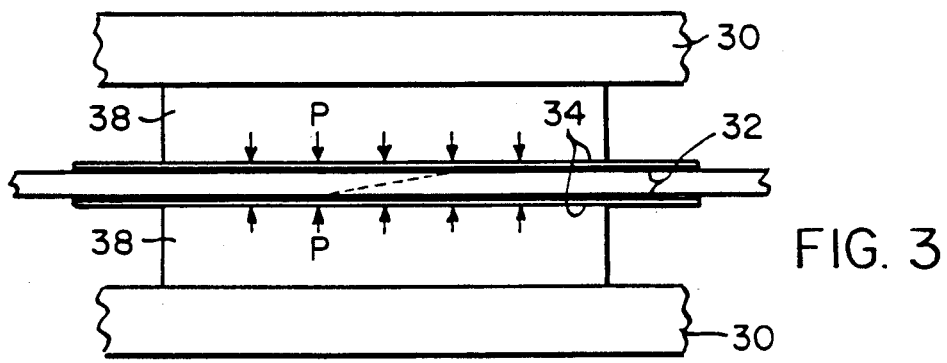
FIG. 3
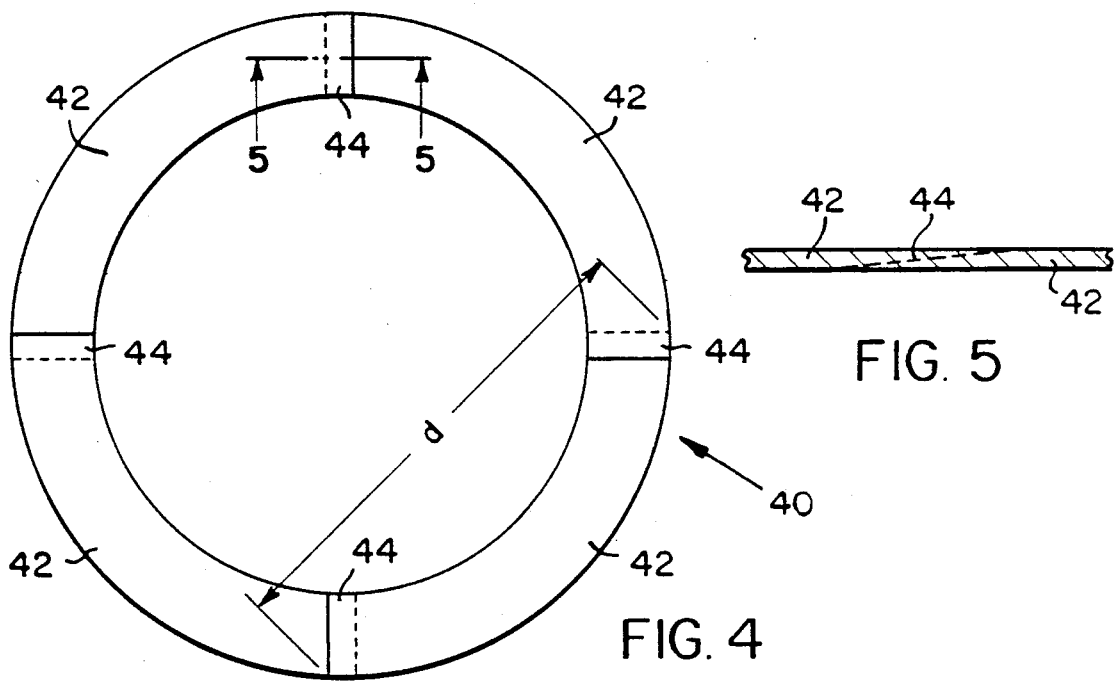
FIG. 4
FIG. 5

WELDING OF FILLED SINTERED POLYTETRAFLUOROETHYLENE

FIELD OF THE INVENTION

This invention relates to the welding of a plurality of filled sintered polytetrafluoroethylen (hereinafter PTFE) components to one another and more particularly to an improved process for such welding whereby strong welds are obtained without substantial harm to the physical properties of the material being welded.

BACKGROUND OF THE INVENTION

Ever since the introduction of PTFE to the market many years ago, fabricators have encountered problems with joining the material to itself or to other materials. These problems have been even more evident when attempting to join sintered PTFE elements. During the ensuing years, a number of bonding and/or welding processes have been developed. For example, U.S. Pat. No. 3,207,644 to Hobson et al. describes a welding process whereby pure PTFE elements are joined by subjecting them to heat and pressure followed by water quench. U.S. Pat. No. 4,701,291 to Wissman discloses a complex process for welding pure PTFE components in a mold and utilizing a bath of molten metal or salt. Neither of these references makes any representation that its process is applicable to filled sintered PTFE components and neither shows any recognition that filled sintered PTFE material presents different processing problems than pure PTFE.

Other bonding or welding processes call for enhancing the integrity of joints by the use of an intermediate layer of fluorine-containing resin such as fluorinated ethylene propylene (FEP) or perfluoroalkoxy (PFA) resin. Examples of such methods are described in U.S. Pat. Nos. 4,211,594 to Freitag et al., 4,073,856 to Chu and 2,833,686 to Sandt. Other prior art patents describe processes for fusing unsintered PTFE surfaces. Among this group are U.S. Pat. Nos. 3,645,820 to Clary, 4,283,448 to Bowman and 4,364.884 to Traut.

These and other methods have been useful for joining homogeneous PTFE, but experience reveals that such methods are not satisfactory for joining filled sintered PTFE components. Sometimes tensile strength across the bond is lower than that of the main body of material, sometimes the surfaces in the area of the weld are poor and sometimes, chemical and/or temperature resistance is reduced. For example, a silica filled PTFE material welded with an FEP intermediate layer was found to have a tensile strength across the weld of about 1350 psi whereas the silica filled PTFE material itself has an average tensile strength of about 2000 psi or more. In another trial, the method of U.S. Pat. No. 3,207,644 was employed with a silica filled PTFE and the tensile strength across the weld was about 1300 psi and elongation was severely reduced. For reason or reasons as yet unknown, the presence of filler(s) in PTFE materials inhibits the obtaining of satisfactory welds.

SUMMARY OF THE INVENTION

These problems are overcome by the present invention whereby welded joints in filled, sintered PTFE materials are obtained without significant adverse effect on the strength, dimensions or other important characteristics of the material in the area of the weld. The improved welding process includes the steps of preparing carefully mated and tapered surfaces on each of the components to be welded and subsequent heating and cooling under pressure.

Thus, it is an object of the invention to provide a relatively simple and effective process for joining or welding together filled sintered PTFE components.

It is a further object to provide a welding process which does not have a significant adverse effect on the properties of such PTFE components.

Another object of the invention is to provide a welding process which will not result in significant thinning of the filled sintered PTFE material in the vicinity of the weld.

Yet another object is to provide large gaskets having substantially uniform properties and characteristics at all locations within the body of such gaskets.

BRIEF DESCRIPTION OF THE DRAWINGS

A fuller understanding of the present invention will be gained by reference to the following detailed description when read in conjunction with the attached drawings in which:

FIG. 1 is an enlarged partial side view of a pair of components to be prepared for welding.

FIG. 2 is an enlarged partial side view similar to FIG. 1, except that the opposed component ends have been formed ready for welding.

FIG. 3 is a partial side view showing the two components assembled in a press for welding.

FIG. 4 is a reduced-sized plan view of an annular gasket formed by welding together four segments or components.

FIG. 5 is a full-sized partial cross-sectional view of a portion of the gasket of FIG. 4 taken along line 5—5.

DETAILED DESCRIPTION OF THE INVENTION

Referring now to the drawings, FIG. 1 shows portions of a pair of filled sintered polytetrafluoroethylene (hereinafter PTFE) components 10, 20 each having an overlap portion 12, 22 intended to be formed and mated to the overlap portion of the other component. The overlap portions are then tapered to an angle B, as shown in FIG. 2, by cutting or grinding or some other suitable forming method to form reverse mated surfaces 14, 24 having a length not substantially less than ½ and preferably in the range of about ¾ to 1". The presently preferred forming method is grinding which provides closer control and greater accuracy of the surfaces 14, 24. Angle B is selected in relation to the component thickness so as to taper the entire length of overlap portions 12, 22 thus producing tapered overlap portions 12', 22' with feathered edges 16, 26. In PTFE gasket applications, the components to be joined may typically be 1/16" or ⅛ thick and have reverse mated surfaces of about ¾ to 1" in length. If thinner component material is used, Angle B becomes smaller in order to maintain the desired length of the reverse mated surfaces. For example, Angle B should be on the order of 8° with ⅛ thick components and about 4° with 1/16" thick material. Each component that is to be welded to another is prepared by tapering its overlap portion in the same manner so as to produce pairs of reverse mated surfaces 14, 24 as shown in FIG. 2.

As shown in FIG. 3, once the tapered overlap portions 12', 22' are prepared, the components to be joined are assembled with their reverse mated surfaces 14, 24 adjacent to one another and placed in a press (not shoWn) between heated platens 30. Sheets of aluminum foil 32 are used adjacent to the components 10, 20 being welded and steel sheets 34 are placed on the other side of the aluminum foil sheets to form a multilayered sandwich. The steel sheets help to maintain smooth surfaces on the material being welded and the aluminum foil prevents the PTFE material from bonding to the steel sheets. Good results have been obtained with temper-hardened aluminum foil of 0.001" thickness and stainless steel sheets on the order of 1/16" thickness. The entire sandwich is clamped to a portion of the press body or a supporting table and the press is closed to apply pressure P to hold the reverse mated surfaces 14, 24 in relative position while heat is applied to the degree and time necessary to fuse the mated surfaces together. Press bars 38 are used to direct the heat and pressure to the desired location at and adjacent to the joint being welded. Preferably the press bars will cover a segment on the order of 3" wide, including and extending on either side of the reverse mated surfaces 14, 24. The preferred initial pressure on some typical material compositions is on the order of 100 to 150 psi and the preferred press temperature is on the order of about 650° F. to 700° F. As the temperature of the filled sintered PTFE components increases, they expand and the pressure within the press increases, typically to a level on the order of 400 to 500 psi. With a typical ⅛ thick component and a preheated press, total time in the press to fuse the components is on the order of 3 minutes. Thinner components will fuse more quickly, while thicker ones will require a longer press time.

Upon completion of the fusing or heating step, the resultant fused assembly is cooled under pressure. Preferably, the assembly is transferred quickly from the heated or fusing press to a cooling press which is then closed to apply and maintain a pressure during the cooling step less than the initial pressure during the heating step. Generally, a pressure on the order of about 5 to 30 psi will be sufficient. Both the heating and the cooling steps may be carried out in the same press if necessary or desired.

Many filler materials are used in making PTFE components with the choice being made to best accommodate the desired properties and characteristics of the finished material. Among suitable fillers are carbon, graphite, silica, a variety of clays and microspheres of glass or other material. According to the variety and quantity of fillers used in the PTFE components, the optimum and maximum allowable pressures for heating and for cooling will vary to a degree. If excessive pressure is applied during the heating process or during the cooling process, there will be an unacceptable degree of flow, distortion or thinning in the area of the joint as compared to the remaining area of the components. In PTFE gasket materials, a very important result of using fillers is that there is a markedly reduced potential for cold flow when such gaskets are placed in service. However, since different fillers produce different results, some experimentation will be needed for any given composition to determine the optimum pressures during the heating and cooling steps of the present welding process. Table 1 illustrates some of the variations in thickness which ca occur with different press pressures during the heating or cooling steps with a silica filled material. For example, one test weld (Sample No. 5) of ⅛ thick material was made with an initial pressure slightly over 1000 psi and even though a strong weld was achieved, the thickness of the area under pressure was reduced more than 0.010". Such a thickness variation is not acceptable in typical gasket applications. Each of the samples shown in Table I attained maximum pressure within three (3) minutes and each passed standard ASTM F147 gasket flex test with no evidence of delamination. Samples 1 and 2 produced unsatisfactory surfaces believed to result from improper alignment of the reverse mated surfaces, excessive material flow and/or differences in thickness of components prior to welding. With some material compositions, it may be advisable to make use of side restraints in at least the hot press to prevent lateral flow of the PTFE composition. Table II shows the results of standard gasket tests for ⅛" thick silica filled PTFE gasket material and compares the test results across a welded joint with the results of the same tests on the same body of material, but in areas adjacent to the areas subjected to the process of the invention. All of the tests follow standard ASTM procedures with the exception of the Blowout Test which is a procedure of the assignee.

TABLE I

| Results of Welding Experiments with Silica Filled Sintered PTFE | | | | | | |
|---|---|---|---|---|---|---|
| Sample No. | 1 | 2 | 3 | 4 | 5 | 6 |
| Heating Time, min. | 3 | 3 | 3 | 3 | 3 | 3 |
| Initial (Press) Pressure, psi | 222.2 | 111.1 | 111.1 | 388.8 | 1111.1 | 111.1 |
| Maximum Pressure, psi | 400 | 450 | 450 | 550 | 1260 | 450 |
| Cooling Time, min. | 4–5 | 4–5 | 4–5 | 4–5 | 4–5 | 4–5 |
| Cooling Pressure, psi | 10 | 10 | 10 | 10 | 10 | 444 |
| Average Thickness of | | | | | | |
| Each Component (10) - | .122 | .118 | .124 | .128 | .125 | .124 |
| Before Welding (20) - | .124 | .121 | .124 | .130 | .125 | .124 |
| Joint Thickness - | | | | | | |
| Range of 6 Measurements | .120 to .122 | .117 to .120 | .121 to .123 | .122 to .123 | .114 to .116 | .112 to .113 |

TABLE II

| Comparison of Measured Properties of Silica Filled Sintered PTFE | | |
|---|---|---|
| | Material Adjacent to Weld Area | Across Welded Joint |
| Average Tensile Strength, psi ASTM F152 | 2197 | 2083 |
| Average Elongation, % ASTM F152 | 321 | 232 |
| Average Compressibility, % ASTM F36 | 12.5 | 8.9 |
| Average Recovery, % ASTM F36 | 42.5 | 48.0 |
| Creep Relaxation, % ASTM F38 | 58.7 | 51.1 |

TABLE II-continued

| Comparison of Measured Properties of Silica Filled Sintered PTFE | | |
|---|---|---|
| | Material Adjacent to Weld Area | Across Welded Joint |
| Average Sealability, ml/hr ASTM F37 | 2.25 | 1.5 |
| Average Blowout @ 500° F., psi | 4467 | 4373 |

Various other joint designs and bonding processes have been tried, but none have obtained the results of the present process and joint design. Instead of the reverse mated surfaces, components with a step joint were subjected to pressurized heating and cooling steps, but the resulting joints failed the standard ASTM F147 gasket flex test at those portions of the joint that were in alignment with the direction of the press pressure (perpendicular to the finished surface) and exhibited a tensile strength of about 950 psi across the weld. Only those joints which have a uniform and positive pressure applied at all points of the mated surfaces during welding and cooling exhibit consistently uniform and high quality. It also seems to be important to mate the opposing surfaces very carefully, especially at the feathered edges, if a smooth surface is to be obtained. Also, the thickness of each component to be joined should be very nearly equal to one another. Failure to exercise the necessary care Will produce joints which are not completely fused and/or which have irregular surfaces.

The process of the invention may be particularly useful, for example, in fabricating large gaskets. At present, filled sintered PTFE gasketing sheet material is available in sizes up to 60" square, but there frequently is a need for gaskets with larger dimensions. Thus, referring to FIG. 4, there is shown a gasket 40 made of N (in this instance, four) components 42 welded to one another at joints 44. If linear dimension "d" is slightly less than 60", then an annular gasket on the order of 80" in diameter may be made by welding together four (4) such components by carrying out the steps of the invention a total of N times. If a still larger diameter gasket is desired, all that is required is to use a larger number N of components, each subtending a smaller arc. FIG. 5 shows a cross-section through a joint 44 of gasket 40 to illustrate the fuse line between reverse mated surfaces as described in detail in the previous description of FIGS. 2 and 3. If, instead of an endless product, a two-ended product is desired, the same process may be used except that the total number of weldments will be N−1 as compared to N components.

While preferred embodiments of the invention have been shoWn and described in detail, other modifications will be readily apparent to those skilled in the art of processing and bonding PTFE resins. Thus, the preceding specification should be interpreted as exemplary rather than as limiting and the scope of the invention is defined by the following claims.

I claim:

1. A method for welding a pair of filled, sintered, polytetrafluoroethylene components to one another comprising the steps of
   a. forming of said components to have an overlap portion,
   b. tapering each of said overlap portions at equal angles to form planar reverse mated surfaces each having a length not substantially less than ½",
   c. assembling said components in a press with the reverse mated surfaces in relatively opposed relationship and in the absence of other material therebetween,
   d. clamping the assembled components in place directly across the area of the reverse mated surfaces to prevent relative movement of said surfaces,
   e. applying heat and pressure sufficient to fuse said reverse mated surfaces without material thinning of the area under pressure as the pressure increases from an initial positive level to a higher level due to thermal expansion, and
   f. cooling the resultant fused assembly at a positive pressure less than the initial pressure of step e.

2. The method of claim 1 wherein said tapering step is accomplished by grinding.

3. The method of claim 1 wherein the length of the reverse mated surfaces is in the range of about ¾" to 1".

4. The method of claim 1 wherein said applying of heat and pressure step is carried out in the range of about 650° F. to 700° F.

5. The method of claim 4 wherein the filler in the PTFE component is silica.

6. The method of claim 5 wherein the initial pressure is in the range of about 100 to 150 psi, increasing by thermal expansion to a final pressure in the range of about 400 to 500 psi.

7. The method of claim 6 wherein the pressure during cooling is maintained in the range of about 5 to 15 psi.

8. A method for welding a plurality of filled, sintered, polytetrafluoroethylene components to one another, wherein N equals the total number of said components, and comprising the steps of:
   a. forming each of said components to have an overlap portion,
   b. tapering each of said overlap portions at equal angles to form planar reverse mated surfaces each having a length not substantially less than ½",
   c. assembling said components in a press with the reverse mated surfaces in relatively opposed relationship and in the absence of other material therebetween,
   d. clamping the assembled components in place directly across the area of the reverse mated surfaces to prevent relative movement of said surfaces,
   e. applying heat and pressure sufficient to fuse said reverse mated surfaces without material thinning of the area under pressure as the pressure increases from an initial positive level to a higher level due to thermal expansion,
   f. cooling the resultant fused assembly at a positive pressure less than the initial pressure of step e, and
   g. repeating steps a to f an additional N−1 times to weld successive pairs of reverse mated surfaces to form a continuous and endless element.

9. The method of claim 8 wherein said tapering step is accomplished by grinding.

10. The method of claim 8 wherein the length of the reverse mated surfaces is in the range of about ¾" to 1".

11. The method of claim 7 wherein said applying of heat and pressure step is carried out in the range of about 650° F. to 700° F.

12. The method of claim 11 wherein the filler in the PTFE component is silica.

13. The method of claim 12 wherein the initial pressure is in the range of about 100 to 150 psi, increasing by thermal expansion to a final pressure in the range of 400 to 500 psi.

14. The method of claim 13 wherein the pressure during cooling is maintained in the range of about 5 to 15 psi.

15. The method of claim 8 wherein said repeating step is carried out simultaneously on each pair of reverse mated surfaces.

16. The method of claim 8 wherein said repeating step is carried out an additional N−2 times to weld successive pairs of reverse mated surfaces to form a continuous and two-ended element.

* * * * *

UNITED STATES PATENT AND TRADEMARK OFFICE
CERTIFICATE OF CORRECTION

PATENT NO. : 4,990,296
DATED : February 5, 1991
INVENTOR(S) : Stefan Pitolaj

It is certified that error appears in the above-identified patent and that said Letters Patent is hereby corrected as shown below:

In Claim 1, Column 5, line 64 of the patent, between "forming" and "of", insert ...each...

Signed and Sealed this

Ninth Day of March, 1993

Attest:

STEPHEN G. KUNIN

*Attesting Officer*          *Acting Commissioner of Patents and Trademarks*